May 30, 1939.    J. G. NICOLSON    2,160,082
APPARATUS AND PROCESS FOR WELDING PIPE
Filed June 8, 1935
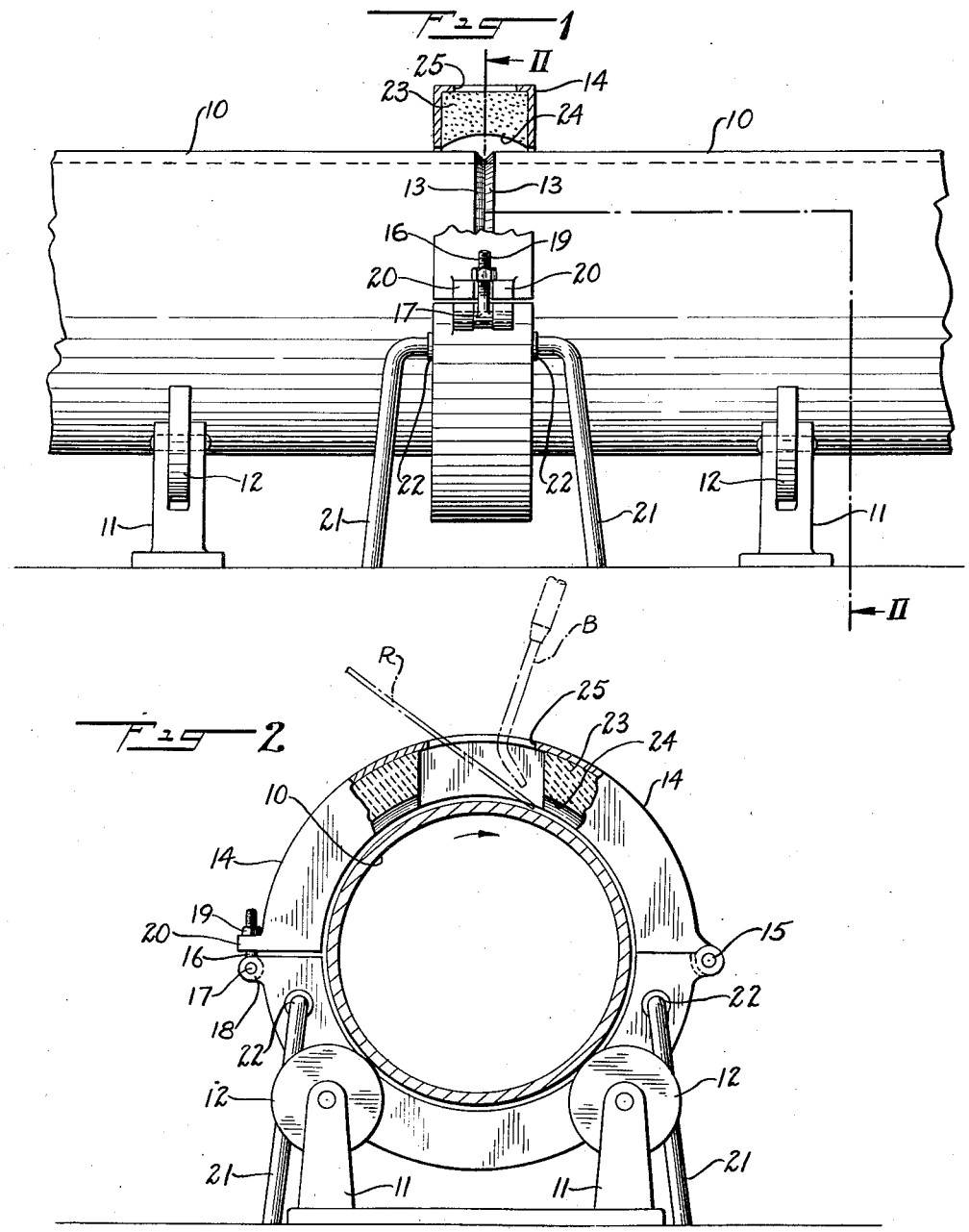
INVENTOR.
JAMES G. NICOLSON
BY
ATTORNEY.

Patented May 30, 1939

2,160,082

UNITED STATES PATENT OFFICE 2,160,082

APPARATUS AND PROCESS FOR WELDING PIPE

James G. Nicolson, Niagara Falls, N. Y., assignor, by mesne assignments, to Union Carbide and Carbon Corporation, a corporation of New York Application June 8, 1935, Serial No. 25,562

4 Claims. (Cl. 113—111)

This invention relates to welding or gas cutting, and more particularly to a process and an apparatus for welding or gas cutting peripherally of a cylindrical shell.

The invention is especially useful in connection with welding a cylindrical shell wherein heat treating or stress relieving operations are required.

In such operations as welding a girth seam about a cylindrical shell, it is generally necessary to stress relieve the entire welded joint after the welding operation, in order that undue internal stresses and local weaknesses may not be present in the welded joint. It is also desirable that unevenness in cooling be avoided in order that heat may not be too suddenly abstracted from the newly welded sections by other portions of the shell which have previously been allowed to cool. Finally, it is desirable to conserve as far as possible heat employed in the welding operation which would otherwise be dissipated into the atmosphere.

One object of the invention therefore, is to maintain the entire joint at a substantially uniform temperature until the welding operation has been completed. Another object is to maintain the joint for an appreciable period of time at an elevated temperature. A further object is the conservation of the welding heat and its continued application to the edges to be welded or the seam which has been welded. Other objects will be apparent upon consideration of the present specification.

The invention is shown by way of illustration in its application to apparatus for welding a girth seam about a cylindrical shell in the accompanying drawing, in which:

Fig. 1 is a side elevation of a cylindrical shell and apparatus embodying the invention; and Fig. 2 is a cross-section on the line II—II of Fig. 1.

According to the present invention means is provided for supporting and rotating the shell; and a channel, closely and entirely surrounding the shell with its flanges turned toward the shell on either side of the contiguous ends to be welded, is supported and held stationary. A refractory lining is preferably disposed within the channel leaving a slight clearance about the edges to be welded or the line of cut as the case may be.

Referring now more particularly to the drawing, it will be seen that they show two metal shell sections 10, 10 and means for supporting and rotating the shell sections comprising two pairs of standards 11, 11 in each of which a wheel 12 is journaled. The shell sections 10 are axially aligned in end to end relation and rest upon the wheels 12. When rotated in any known or convenient manner the two sections turn in unison and freely about their common axis while resting upon the wheels. The contiguous edges 13, 13 of the shell sections which are to be welded are shown centrally in Fig. 1 and are illustrated as being chamfered as is usual where metal of any thickness is to be welded.

A channel 14 closely encircles the adjoining portions of the shell sections 10 with its flanges turned toward the shell on either side of the contiguous edges 13, 13 which are to be welded. The channel 14 therefore encircles the edges 13, 13 entirely. There is thus formed an inwardly concave channel ring for surrounding the seam to be welded or a cutting line. The channel 14 is preferably formed in two halves so that it may be easily placed in position and removed from position completely encircling a girth seam or cutting line. Accordingly, a hinge 15 is shown as connecting the two halves of the channel 14, which abut along a horizontal plane as illustrated in Fig. 2, and a bolt 16, pivoted as at 17 to a projecting lug 18 on the lower half of the channel 14 carries a nut 19 on its threaded end which is adapted to swing between bifurcations 20, 20 of a lug on the upper half of the channel 14 opposite the hinge 15. It will thus be seen that the channel may be opened and taken away from the cylindrical shell when the welding operation has been completed, and may be set up anew for a similar operation with great ease and convenience.

The channel 14 is preferably independently supported and held stationary in position about the cylindrical shell sections 10, and clearly a variety of means may be employed to this end. As here shown, legs 21, 21 are pivoted as at 22 to the lower half of the channel 14. These legs are so constructed and arranged that, when the free ends of the legs 21 rest upon the flooring upon which the remainder of the apparatus stands, the channel 14 is supported in position. Whatever the channel supporting means may be, it is adapted to relieve the shell of the weight of the channel.

A refractory lining 23 is provided within the channel and extends completely around the cylindrical shell, as does the channel. The lining may be made of any suitable refractory material, although it is at present preferred to employ a magnesite mixture with a suitable binder such as a small percentage of "Albany slip clay." In any case, the refractory employed must be capable of withstanding an extreme concentration of heat over an appreciable period of time. The lining is inwardly concave, that is to say the surface of the refractory lining is arched away from the edges 13 as at 24, in order to provide a clear and substantially enclosed passage completely around the seam or cutting line.

Space must be allowed for access of the blow-pipe B and the welding rod R to the contiguous edges 13, 13, and accordingly an opening 25 may be provided in the channel 14, preferably at its uppermost portion. This opening is extended through the refractory lining, where one is used. It has been found convenient to provide an opening of about two inches in width and about five inches in length although, of course, the size of the opening may be varied according to conditions of operation. The positions of the welding rod R and the blowpipe B are illustrated in Fig. 2. It will thus be apparent that the welding jet is applied to the seam in the general direction of rotation of the shell whereby it is possible to project substantially all of the welding flame and hot gases within the enclosed space surrounding the edges in order to keep the temperature of the entire seam elevated during the welding operation and to more effectively utilize the heat supplied by the welding flame.

From the foregoing it will be apparent that, by enclosing substantially the entire outer circumference of the contiguous edges to be welded, applying welding heat and fused weld metal to the edges, and rotating the shell sections in the same direction with respect to the application of welding heat, the welding flame and the heat therefrom will follow the enclosed edges and the deposited weld metal around the seam so that it is possible to conserve heat which would otherwise be dissipated to the atmosphere and would not be available to the metal which is being welded. Thus, in welding, the entire welded joint may be maintained at substantially welding temperature, throughout the welding operation, and a satisfactory annealed weld is produced. Local stresses are thereby relieved and the need of further stress relieving is eliminated. Clearly, auxiliary heating may be employed to supplement the welding flame for this purpose when such auxiliary heating is needed. This may be the case when welding pipe of large diameter.

According to the present method, at least a portion of the gases incident to the wleding heat are directed and confined about a substantial portion of the edges on either side of the point of application of the welding heat, and the unburned portion of the gases so directed and confined is burned within the closure so provided. The heat of both the burned and unburned gases is reflected toward the edges from the inner walls of the channel, or from its refractory lining, where one is used. The present invention is particularly effective in producing the desired uniform temperature around the entire weld or cut.

From the foregoing it will be evident that stress relieving and heat treatment may be simply, inexpensively, and conveniently effected during welding or gas cutting where the present invention is employed.

Although the invention is here specifically described in connection with a welding operation, it will be clear that the same principles may be applied in connection with a cutting operation. Furthermore, it will be realized that the particular application of the invention here described is presented merely to show how the invention may be applied. Other forms, differing in detail but not in principle from that here disclosed, and similar variations in the steps of carrying out the invention, will readily suggest themselves to those skilled in the art.

I claim:

1. A method of producing an annealed weld between two cylindrical metal sections in end to end relation which comprises enclosing substantially the entire outer circumference of the seam formed by the contiguous ends of said sections; rotating said sections in unison about their common longitudinal axis while their contiguous ends are so enclosed; and applying a welding flame against said ends and in the general direction of such rotation so that the rotating sections will cause said flame and heat therefrom to follow such enclosed ends in the direction of such rotation and keep the completed weld at a substantially uniform temperature throughout the welding operation.

2. A method of producing an annealed weld between two cylindrical metal sections in end to end relation which comprises enclosing substantially the entire outer circumference of the seam formed by the contigous edges of said sections; rotating said sections in unison about their common longitudinal axis while their contiguous edges are so enclosed; and applying a welding flame against said edges and in the general direction of such rotation while fusing and depositing weld metal along said edges, whereby such rotating sections cause said flame and heat therefrom to follow such enclosed edges and keep the deposited weld metal at a substantially uniform temperature throughout the welding operation.

3. Apparatus for welding a girth seam or making a peripheral gas cut around the outer side of a cylindrical metal shell, said apparatus comprising means adapted to support said shell for rotation about its longitudinal axis; a body including refractory material and formed of two halves secured together and abutting along a horizontal plane, said refractory material extending around said shell and substantially enclosing the outer side of said seam or the cutting line; and means comprising legs pivotally connected to the lower half of said body for supporting said body independently of said shell, such supporting means being constructed and arranged to relieve said shell of the weight of said body and to hold said body stationary while said shell is rotated.

4. Apparatus for welding a girth seam or making a peripheral gas cut around the outer side of a cylindrical metal shell, such apparatus comprising means constructed and arranged to support said shell for rotation about its longitudinal axis; a channel adapted to encircle said shell and having flanges turned inwardly toward the shell on either side of the seam or cutting line; said channel being formed of two halves secured together and abutting along a horizontal plane; a lining of refractory material secured within each of the haves of said channel and adapted to substantially enclose the outer side of the seam or cutting line; and legs pivotally connected to the lower half of said channel and constructed and arranged to support the channel and its refractory lining on the floor below and independently of said shell, to relieve the shell of the weight of the channel and refractory lining and to hold the channel and refractory lining stationary when the shell is rotated.

JAMES G. NICOLSON.